United States Patent [19]

Harkins, Jr. et al.

[11] 4,308,143

[45] Dec. 29, 1981

[54] ROTARY DRUM FILTER

[75] Inventors: Alvin E. Harkins, Jr., Houston; Wesley D. Blank, Pasadena, both of Tex.

[73] Assignee: Ethyl Corporation, Richmond, Va.

[21] Appl. No.: 214,136

[22] Filed: Dec. 8, 1980

Related U.S. Application Data

[63] Continuation of Ser. No. 89,144, Oct. 29, 1979, abandoned.

[51] Int. Cl.³ .............................................. B01D 33/10
[52] U.S. Cl. ..................................... 210/402; 55/351; 55/507
[58] Field of Search ...................... 55/351, 400, 507; 210/402–404; 209/403, 406, 407

[56] References Cited

U.S. PATENT DOCUMENTS

| 2,204,928 | 6/1940 | Culver | 210/404 |
| 2,259,235 | 10/1941 | Weiss | 210/402 |
| 2,534,161 | 12/1950 | Collins | 210/402 |
| 3,036,354 | 5/1962 | De Bie | 210/404 |
| 3,300,052 | 1/1967 | Steintveit | 210/402 |
| 3,954,622 | 5/1976 | Kus | 210/404 |

FOREIGN PATENT DOCUMENTS 1008257 5/1957 Fed. Rep. of Germany ...... 209/403

Primary Examiner—David L. Lacey
Attorney, Agent, or Firm—Donald L. Johnson; John F. Sieberth; Paul H. Leonard

[57] ABSTRACT

A rotary drum filter apparatus comprising a rotary drum, a plurality of axial, parallel slots spaced circumferentially around the drum, a filter cloth positioned peripherally around the drum and portions thereof extending into each of the axial slots, flexible metal means inserted into each of the slots over the portion of the filter cloth extending into the slots and caulking means for holding each of the metal means and each of said portions of said filter cloth in a locked position in their respective axial slots. The metal means may comprise a stranded metal cable wherein caulking means are unnecessary.

5 Claims, 3 Drawing Figures

ROTARY DRUM FILTER

This is a continuation of application Ser. No. 89,144, filed Oct. 29, 1979, now abandoned.

BACKGROUND OF THE INVENTION

The present invention relates to a rotary drum filter and particularly to a method and apparatus of securing or fastening a filter cloth to the drum of a rotary vacuum filter.

In one type of conventional rotary drum filter presently in use, the drum has a plurality of axial dovetail slots spaced at predetermined intervals around the drum. The filter cloth is placed around the drum and is wedged or forced into the dovetail slots by means of a caulking cord. During a blowback cycle, the caulking cords tend to roll out of their respective slots thereby freeing the filter cloth and thus rendering proper filtering impossible. For moderate to severe blowback pressures, it has been necessary to employ wires or bands to hold the filter cloth in place around the drum. Such wires or bands have a number of disadvantages. They restrict the flexing of the filter cloth, thereby reducing the effectiveness of the discharge. They reduce the filter area by as much as ten percent. They cause channeling during the wash cycle. Finally, they limit the removal of the filter cake with a "doctor" knife.

The present invention provides an apparatus and method which completely eliminates the need for wires and bands.

An object of the invention is to provide a deformable metal means which firmly fastens or secures a filter cloth in an axial slot on a rotary drum. Such metal means not only provides torsional stability, preventing rolling from the slot, but also holds the filter cloth sufficiently securely in place that the cloth itself will tear before it can be pulled from the slot.

A primary object of the present invention is to provide a flexible or deformable metal screen which can be secured over a portion of a filter cloth in a slot and wedged therein by means of a caulking cord.

Another object of the present invention is to provide a multiple stranded metal wire cable which can be wedged or forced into a dovetail slot of a rotary drum for firmly securing or holding a portion of a filter cloth in place on the drum. The cable is sufficiently flexible to deform into the slot, but offers sufficient torsional resistance to inhibit rolling of the cable from the slot.

Other objects and advantages of the present invention will become more readily apparent from a consideration of the following descriptions and drawings.

SUMMARY OF THE INVENTION

The present invention comprises a rotary drum with a plurality of axial dovetail slots thereon, a filter cloth around the drum and deformable metal means positioned over a portion of the filter cloth and in the dovetail slots to thereby securely or firmly hold the filter cloth in place around the drum without the necessity of wires, bands or any other type of fasteners.

The present invention also provides a means for securing or holding a filter cloth on a rotary drum, wherein the filter cloth is placed around the drum and portions of the cloth are forced into each of the axial slots spaced circumferentially around the drum by forcing a deformable metal means into the slots thereby firmly securing the filter cloth to the drum.

DESCRIPTION OF THE PREFERRED EMBODIMENT

Figure 1:
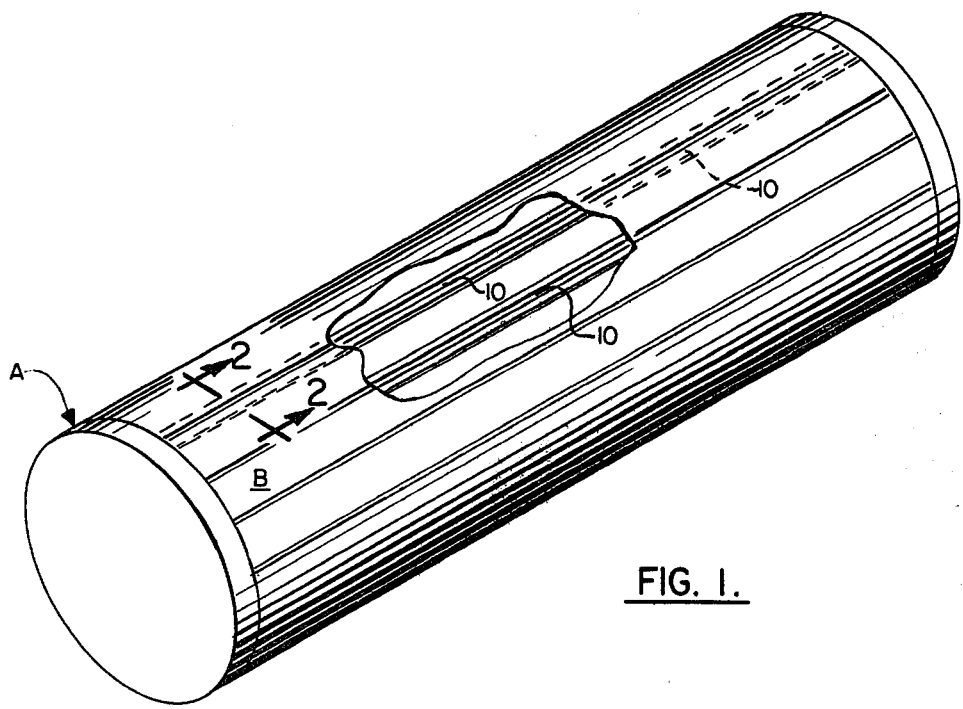
FIG. 1 is a perspective view of a rotary drum with axial dovetail slots and with filter cloth thereon. A portion of the filter cloth is cut-away to illustrate the filter cloth holding apparatus and method of the invention.

Referring now to the drawings, a rotary drum A is illustrated in FIG. 1. A filter cloth B is positioned circumferentially around the drum A. The drum A has a plurality of circumferentially or axially parallel and spaced apart slots 10 positioned thereon.

Figure 2:
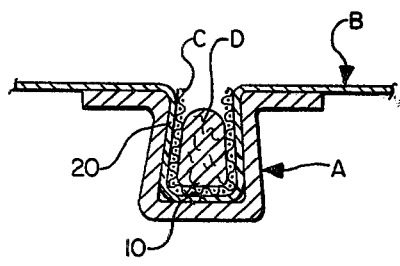
FIG. 2 is a sectional view taken along line 2—2 illustrating the holding apparatus and method of the present invention in greater detail.

As best seen in FIG. 2, a portion 20 of the filter cloth B is forced into each of the slots 10 and held in place therein by a deformable metal means C such as a wire screen. A caulking cord D is forced into each of the slots further securing the filter cloth B, wire screen C in each of the slots 10. The wire screen or flexible metal cloth C is deformed to the extent that one side or surface of the screen C extending into the slot 10 is adjacent to the filter cloth B so as to force the cloth B into contact with the surface of the slot 10. In effect, the shape of the screen C is conformed to the shape of the slot 10. The screen C is completely within the confines of the slot 10. With the caulking cord D in place in the slot 10, the filter cloth B is firmly secured in the slot 10.

Figure 3:
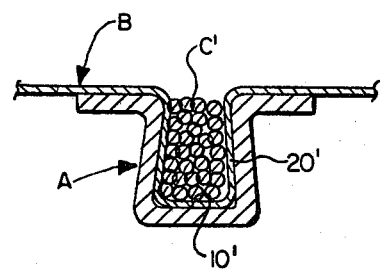
FIG. 3 is a view similar to that of FIG. 2, illustrating an alternate embodiment of the invention.

In FIG. 3, an alternate embodiment of the invention is disclosed, wherein a caulking cord is unnecessary and the flexible metal means C' is a stranded metal cable which has been deformed so as to firmly secure the filter cloth portion 20' into the slot 10'. The stranded metal cable C' is inserted into the slot 10' and deformed to the extent that the surface or portion thereof of the cable adjacent to the portion of the filter cloth B in the slot 10' is conformed to the shape of the slot 10'. The cable C' is completely within the confines of the slot 10'. The deformation of the cable C' effectively locks the cable C' in place over the filter cloth B in the slot 10' to thereby firmly secure the cloth B in the slot 10'.

The wire screen is preferably a heavy stainless steel screen wire. The stranded metal cable is also preferably of stainless steel. Any other suitable type of metal cloth, screen or cable may be used as suitable. It is essential, however, that such metal be sufficiently flexible and/or deformable so as to be readily forced into the dovetail slots. The caulking cord should be of sufficiently strong material so as to withstand the operations for which the use of the rotary drum filter is intended. Generally, standard caulking cords may be used.

It can be appreciated that the slots may be of various shapes, however, the slot should be wider at the base than at the top. A dovetailed shape or the like is generally preferable.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A rotary drum filter apparatus comprising a rotary drum having a plurality of axial parallel slots spaced peripherally around the rotary drum, each of said slots being wider at its base than at its top, a filter cloth positioned peripherally around the rotary drum and portions of said cloth extending into each of the axial parallel slots, a flexible metal screen inserted into each of the slots over the portion of the filter cloth extending into the slots, each of said metal screens being sufficiently deformed in each of said slots forcing each of said filter cloth portions in said slots adjacent the surface of each of their respective slots, each of said metal screens being within the confines of its respective slot and substantially conforming to the configuration of said respective slot, and a caulking means inserted into each of said slots over each of said metal screens, thereby holding each of said portions of said filter cloth in a locked position in their respective slots.

2. The rotary drum filter apparatus of claim 1, wherein when viewed in cross section the axial slots are substantially dovetailed in shape.

3. The rotary drum filter apparatus of claim 1, wherein the caulking means is a flexible caulking cord.

4. A rotary drum filter apparatus comprising a rotary drum having a plurality of axial parallel slots spaced peripherally around the rotary drum, each of said slots being wider at its base than at its top, a filter cloth positioned peripherally around the rotary drum and portions of said cloth extending into each of the axial parallel slots, a stranded metal cable inserted into each of the slots over the portion of the filter cloth extending into the slots, each of said metal cables being sufficiently deformed in their respective slots forcing each of said filter cloth portions in said slots adjacent the surface of each of their respective slots, each of said metal cables being within the confines of its respective slot and the exterior portion thereof adjacent to said filter cloth portion substantially conforming to the configuration of said respective slot, thereby holding each of said portions of said filter cloth in a locked position in their respective slots.

5. The rotary drum filter apparatus of claim 4, wherein when viewed in cross section the axial slots are substantially dovetailed in shape.

* * * * *